(12) United States Patent
Cheng et al.

(10) Patent No.: US 10,360,710 B2
(45) Date of Patent: Jul. 23, 2019

(54) METHOD OF ESTABLISHING VIRTUAL MAKEUP DATA AND ELECTRONIC DEVICE USING THE SAME

(71) Applicant: ASUSTeK COMPUTER INC., Taipei (TW)

(72) Inventors: Yi-Chi Cheng, Taipei (TW); Chung-Ming Sun, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 108 days.

(21) Appl. No.: 15/620,827

(22) Filed: Jun. 13, 2017

(65) Prior Publication Data

US 2017/0358116 A1    Dec. 14, 2017

(30) Foreign Application Priority Data

Jun. 14, 2016  (TW) .............................. 105118506 A

(51) Int. Cl.
  *G06T 11/60*   (2006.01)
  *G06K 9/00*   (2006.01)

(52) U.S. Cl.
  CPC .......... *G06T 11/60* (2013.01); *G06K 9/00228* (2013.01); *G06K 9/00268* (2013.01)

(58) Field of Classification Search
  None
  See application file for complete search history.

(56) References Cited

U.S. PATENT DOCUMENTS

| 6,502,583 B1* | 1/2003 | Utsugi | A61K 8/02 132/200 |
| 2012/0177288 A1* | 7/2012 | Chaussat | G06K 9/00281 382/165 |
| 2012/0223956 A1* | 9/2012 | Saito | A45D 44/005 345/582 |
| 2013/0169827 A1* | 7/2013 | Santos | H04N 5/23229 348/207.1 |
| 2015/0049111 A1* | 2/2015 | Yamanashi | G06T 11/001 345/632 |
| 2015/0050624 A1* | 2/2015 | Yamanashi | A45D 44/00 434/100 |

(Continued)

FOREIGN PATENT DOCUMENTS

| CN | 101557487 | 10/2009 |
| CN | 201726494 | 1/2011 |

*Primary Examiner* — Michael J Cobb
(74) *Attorney, Agent, or Firm* — JCIPRNET

(57) ABSTRACT

A method of establishing virtual makeup data, an electronic device and a non-transitory computer readable storage medium are provided. The method includes: adjusting a scope of the makeup face in the first image to match a predetermined face scope in a predetermined image; defining a plurality of areas on the adjusted makeup face, and each of the areas corresponds to a makeup category; capturing a plurality of first makeup features of at least one of the target makeup category in the makeup category; comparing the first makeup features with a plurality of second makeup features in the database whose target makeup category are same; adding a first makeup pattern including the first makeup features to the target makeup category of the database when the first makeup feature is different from the second makeup feature.

14 Claims, 11 Drawing Sheets

(56) References Cited

U.S. PATENT DOCUMENTS

| | | | |
|---|---|---|---|
| 2015/0254501 A1* | 9/2015 | Yamanashi | G06K 9/00268 348/78 |
| 2015/0366328 A1* | 12/2015 | Tamura | A45D 44/00 434/100 |
| 2016/0042557 A1* | 2/2016 | Lin | G06T 7/73 345/426 |
| 2016/0110587 A1* | 4/2016 | Han | G06K 9/00288 382/118 |
| 2016/0128450 A1* | 5/2016 | Saito | A45D 44/005 345/633 |
| 2016/0196665 A1* | 7/2016 | Abreu | G06T 11/00 345/427 |
| 2016/0357578 A1* | 12/2016 | Kim | G06T 11/001 |

* cited by examiner

| makeup classification | eye makeup | | |
|---|---|---|---|
| target makeup classification | eye shadow | eyeliner | eyelashes |
| makeup feature — color | blue and purple | black | black |
| makeup feature — shape | ◠ | ◇ | 👁 |
| makeup feature — rage | within a width of eyes | profile around the whole eye | |
| makeup feature — material | sequins, shining powders | | plastic |
| makeup feature — length | | | 0.8 centimeter |
| | 410 | 420 | 430 |

METHOD OF ESTABLISHING VIRTUAL MAKEUP DATA AND ELECTRONIC DEVICE USING THE SAME

CROSS-REFERENCE TO RELATED APPLICATION

This application claims the priority benefit of TW application serial No. 105118506, filed on Jun. 14, 2016. The entirety of the above-mentioned patent application is hereby incorporated by reference herein and made a part of specification.

BACKGROUND OF THE INVENTION

Field of the Invention

The invention relates to a method of establishing data, an electronic device and a non-transitory computer readable storage medium thereof and, more specifically, to a method of establishing virtual makeup data, an electronic device with a method thereof and a non-transitory computer readable storage medium.

Description of the Related Art

With the development of communication technology, a demand on image transmission and real-time image communication becomes higher. Images are showed directly on a display device for users to select and adjust via a controller (such as, a touch panel of an electronic device) for more entertainment. For example, when applied a virtual makeup system, feature points (such as eyes, lips and so on) at a two-dimensional image of a face are usually identified at the beginning. Then, a virtual makeup (such as virtual eye shadow, virtual lipstick) process is provided at a corresponding position of the two-dimensional image.

BRIEF SUMMARY OF THE INVENTION

According to an aspect of the disclosure, a method of establishing virtual makeup data adapted to an electronic device is provided. The method of establishing data includes the steps: receiving a first image of a makeup face, and identifying the makeup face in the first image; adjusting a scope of the makeup face in the first image to match a predetermined face scope in a predetermined image; defining a plurality of areas on the adjusted makeup face in the first image, wherein each of the areas corresponds to a makeup category, the makeup category includes a plurality of target makeup categories, and each of the target makeup categories includes a plurality of makeup features; capturing a plurality of first makeup features of at least one of the target makeup categories in the makeup category; comparing the first makeup features with a plurality of the second makeup features in a database to classify the first makeup features, wherein a target makeup category which the second makeup features are belonged to is same to the target makeup category which the first makeup features are belonged to; and adding a first makeup pattern with the first makeup features into the target makeup category of the database when the first makeup features are different from the second makeup features.

According to another aspect of the disclosure, a virtual makeup data establishing platform executed by an electronic device is provided. The virtual makeup data establishing platform includes an input module, an image processing module, a makeup feature capturing module, a makeup feature comparing module and a makeup feature classifying module, wherein the input module receives a first image with a makeup face, and the image processing module identifies the makeup face in the first image, wherein the image processing module adjusts a scope of the makeup face in the first image to match a predetermined face scope in a predetermined image, the makeup feature capturing module defines a plurality of areas on the adjusted makeup face in the first image, each of the areas corresponds to a makeup category, the makeup category includes a plurality of target makeup categories, and each of the target makeup categories includes a plurality of makeup features, the makeup feature capturing module captures a plurality of first makeup features of at least one of the target makeup category corresponding to the makeup category; the makeup feature comparing module compares the first makeup features with a plurality of the second makeup features in a database to classify the first makeup features, and the target makeup category which the second makeup features are belonged to is same to the target makeup category which the first makeup features are belonged to; the makeup feature classifying module adds a first makeup pattern with the first makeup features to the target makeup category of the database when the first makeup features are different from the second makeup features.

According to another aspect of the disclosure, an electronic device of a virtual makeup data establishing platform is provided. The electronic device comprises a storage device configured to store a database and a plurality of modules; and a processor, connected to the storage device, loads and executes the modules stored in the storage device, the modules include: an input module, an image processing module, a makeup feature capturing module, a makeup feature comparing module and a makeup feature classifying module, wherein the input module receives a first image with a makeup face, and the image processing module identifies the makeup face in the first image, wherein the image processing module adjusts a scope of the makeup face in the first image to match a predetermined face scope in a predetermined image, the makeup feature capturing module defines a plurality of areas on the adjusted makeup face in the first image, each of the areas corresponds to a makeup category, the makeup category includes a plurality of target makeup categories, and each of the target makeup categories includes a plurality of makeup features, the makeup feature capturing module captures a plurality of first makeup features of at least one of the target makeup category corresponding to the makeup category; the makeup feature comparing module compares the first makeup features with a plurality of the second makeup features in a database to classify the first makeup features, and the target makeup category which the second makeup features are belonged to is same to the target makeup category which the first makeup features are belonged to; the makeup feature classifying module adds a first makeup pattern with the first makeup features to the target makeup category of the database when the first makeup features are different from the second makeup features.

According to another aspect of the disclosure, a non-transitory computer readable storage medium is provided. The non-transitory computer readable storage medium stores at least one program instruction. After at least one program instruction is loaded in an electronic device, steps are executed: receiving a first image of a makeup face, and identifying the makeup face in the first image; adjusting a scope of the makeup face in the first image to match a predetermined face scope in a predetermined image; defining a plurality of areas on the adjusted makeup face in the first image, wherein each area corresponds to a makeup category, the makeup category includes a plurality of target makeup categories, and each of the target makeup categories includes a plurality of makeup features; capturing a plurality of first makeup features of at least one of the target makeup categories in the makeup category; comparing the first makeup features with a plurality of the second makeup features in a database to classify the first makeup features, wherein a target makeup category which the second makeup features are belonged to is same to the target makeup category which the first makeup features are belonged to; and adding a first makeup pattern with the first makeup features into the target makeup category of the database when the first makeup features are different from the second makeup features.

In sum, according to the method of establishing virtual makeup data, the virtual makeup data establishing platform, the electronic device with the virtual makeup data establishing platform and the non-transitory computer readable storage medium, the number of the makeup patterns in the database is increased automatically according to images input by the user and the existing makeup patterns in the database. As a result, the practicality of the virtual makeup data establishing platform and the operation convenience of the user are improved.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
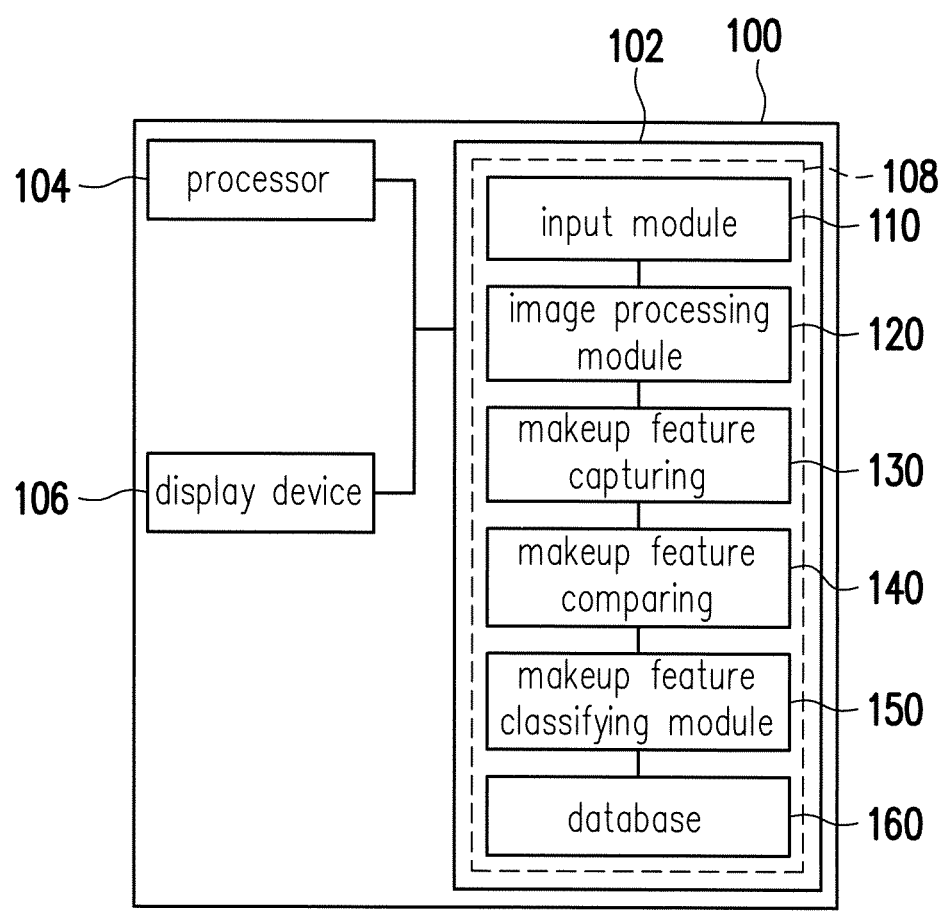
FIG. 1 is a block diagram showing an electronic device with a virtual makeup data establishing platform in an embodiment.

FIG. 1 is a block diagram showing an electronic device with a virtual makeup data establishing platform in an embodiment.

Please refer to FIG. 1, the electronic device 100 includes a storage device 102, a processor 104 and a display device 106. In an embodiment, the electronic device 100 is a portable apparatus, a personal digital assistant (PDA), a notebook, a tablet computer or another device with a camera function, such as a digital camera, a camera, a communication device, an audio player or a video player, which is not limited herein.

The storage device 102 is a random access memory (RAM), a read-only memory (ROM), a flash memory, a solid state drive (SSD) or other similar elements or a combination of thereof. In an embodiment, the storage device 102 is configured to store a virtual makeup establishing platform 108. The virtual makeup establishing platform 108 includes an input module 110, an image processing module 120, a makeup feature capturing module 130, a makeup feature comparing module 140, a makeup feature classifying module 150 and a database 160.

The processor 104 is connected to the storage device 102. The processor 104 is a central processing unit (CPU) with a signal core or multiple cores, a microprocessor, a digital signal processor (DSP), a programmable controller, an application specific integrated circuit (ASIC), or another similar component or a combination thereof. In an embodiment, the processor 104 is configured to access and execute the modules stored in the storage device 102 to run the virtual makeup establishing platform 108. The method of establishing virtual makeup data is then executed.

The display device 106 is connected to the storage device 102 and the processor 104. The display device 106 is a touch screen, such as a resistive touch panel, a capacitive touch panel, an optical touch panel, an acoustic wave touch panel, or an electromagnetic touch panel. In another embodiment, the display device 106 is a non-touch screen, such as a liquid crystal display screen, a plasma screen or a projection screen.

Figure 2:
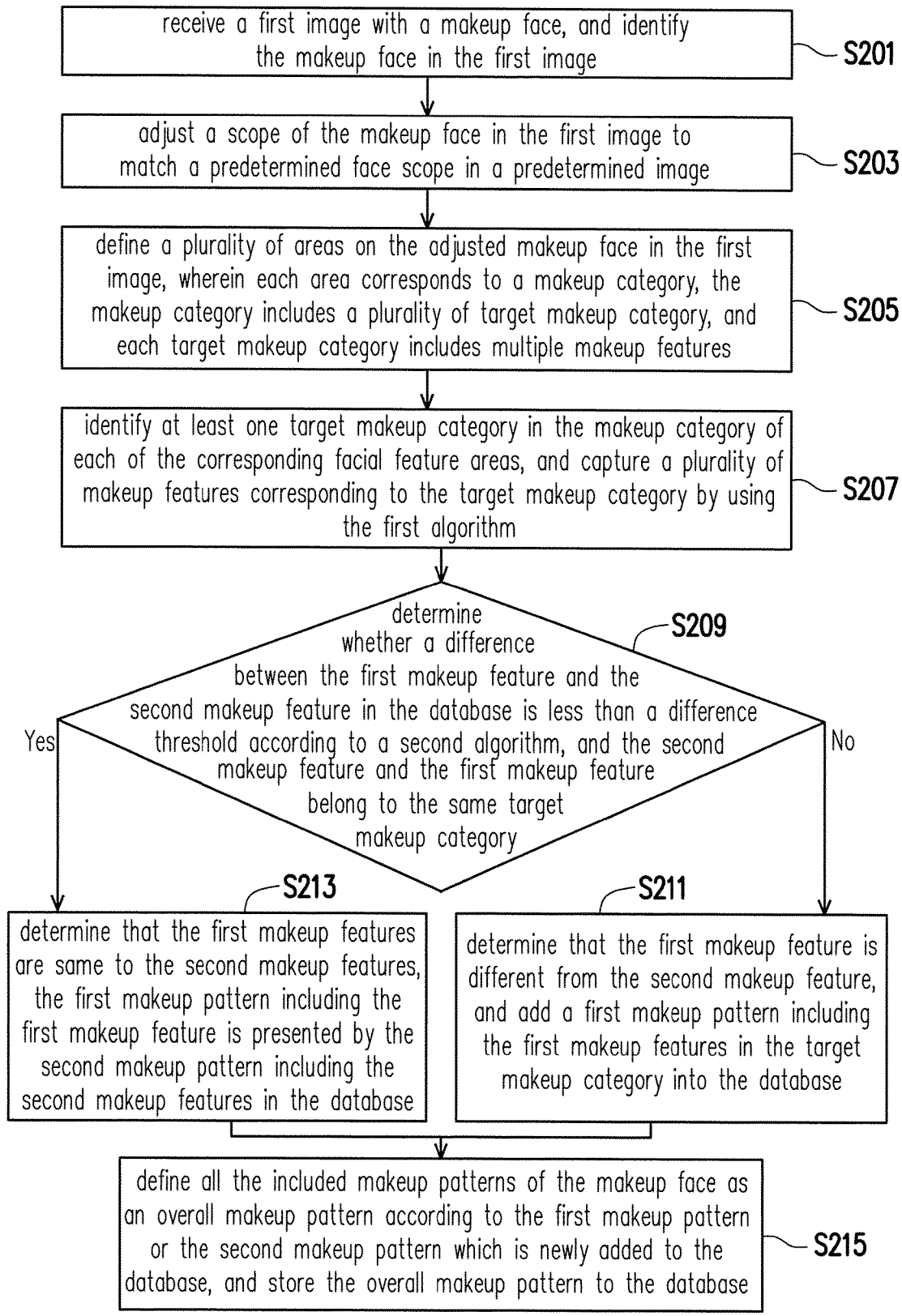
FIG. 2 is a flowchart showing a method of establishing virtual makeup data in an embodiment.

FIG. 2 is a flowchart showing a method of establishing virtual makeup data in an embodiment. FIG. 3A to FIG. 3D are schematic diagrams showing a makeup image processed by virtual makeup establishing platform. FIG. 4 is a schematic diagram showing an example of capturing makeup features in an embodiment. The method is adapted to the electronic device 100. The operation of the electronic device 100 and the virtual makeup establishing platform 108 are further illustrated cooperating with various components of the electronic device 100 in FIG. 1.

Figure 3A:
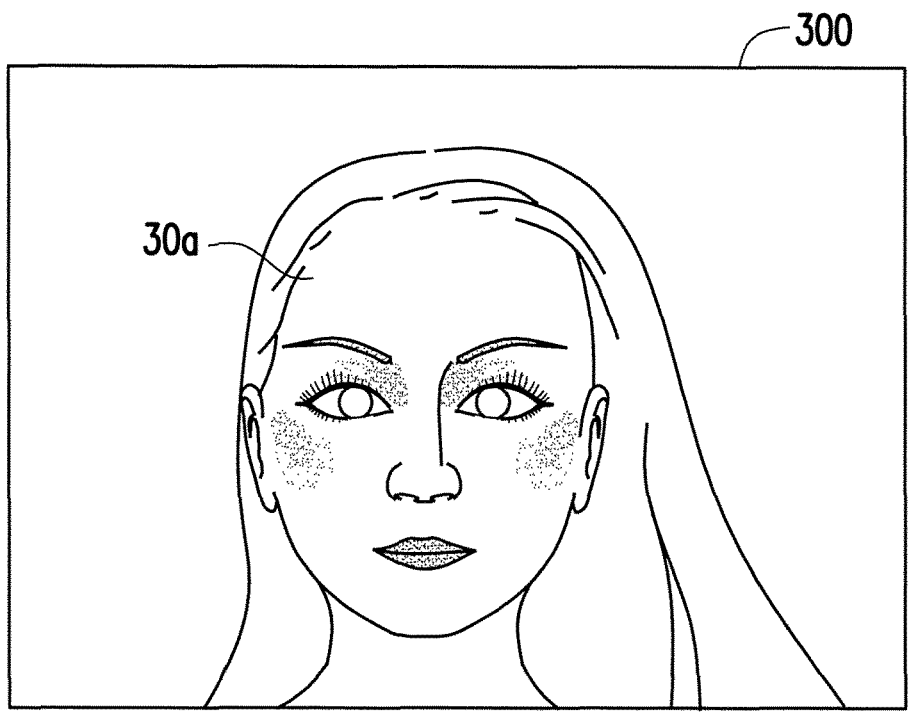
FIG. 3A to FIG. 3D are schematic diagrams showing a makeup image processed by a virtual makeup data establishing platform in an embodiment.
Figures 4, 5A:
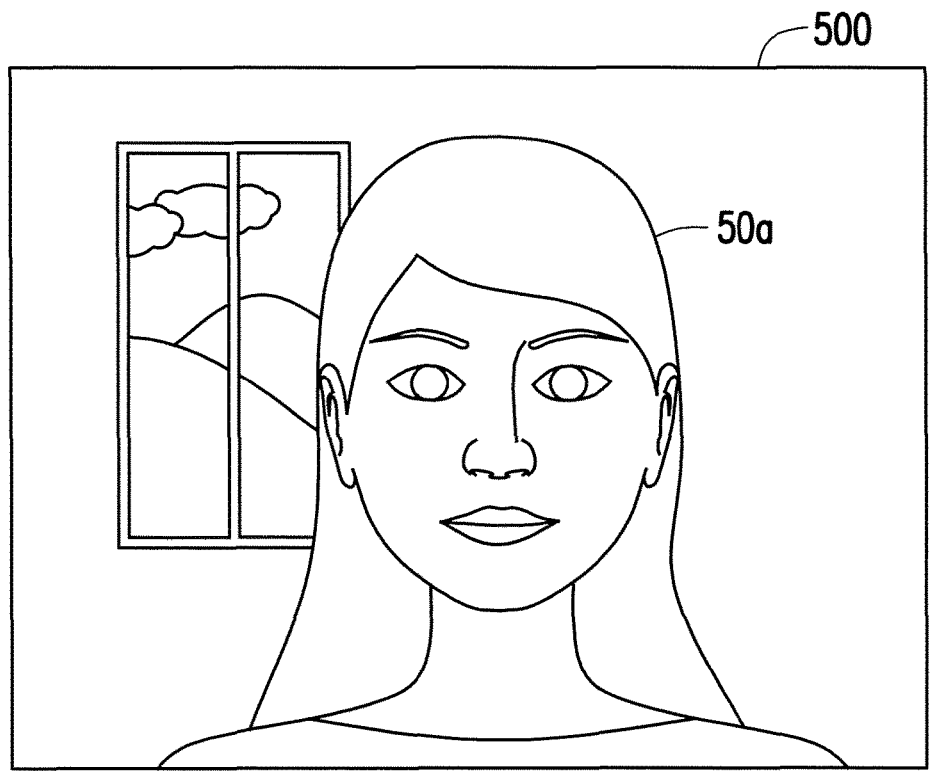
FIG. 4 is a schematic diagram showing an example of capturing makeup features in an embodiment.
FIG. 5A to FIG. 5F are schematic diagrams showing a virtual makeup presented on an output image by a virtual makeup data establishing platform according to an input signal.

Please refer to FIG. 2 and FIG. 3A, in step S201, the input module 110 receives an image 300 with makeup (also called as a first image 300). The image processing module 120 identifies the makeup face 30a in the first image 300. In an embodiment, an image with a makeup face is taken via the electronic device 100 with a camera function to obtain the makeup effect of the makeup face. For example, a person with makeup or a flat image with a makeup face on magazines and webs is taken via a camera unit (not shown) of the electronic device 100 to get the image 300 with makeup effects which the user wants to simulate, which is not limited herein. In an embodiment, the electronic device 10 further includes a communication unit (not shown). The communication unit receives or downloads the image 300 with makeup from an electronic device or a cloud database via network.

Figure 3B:
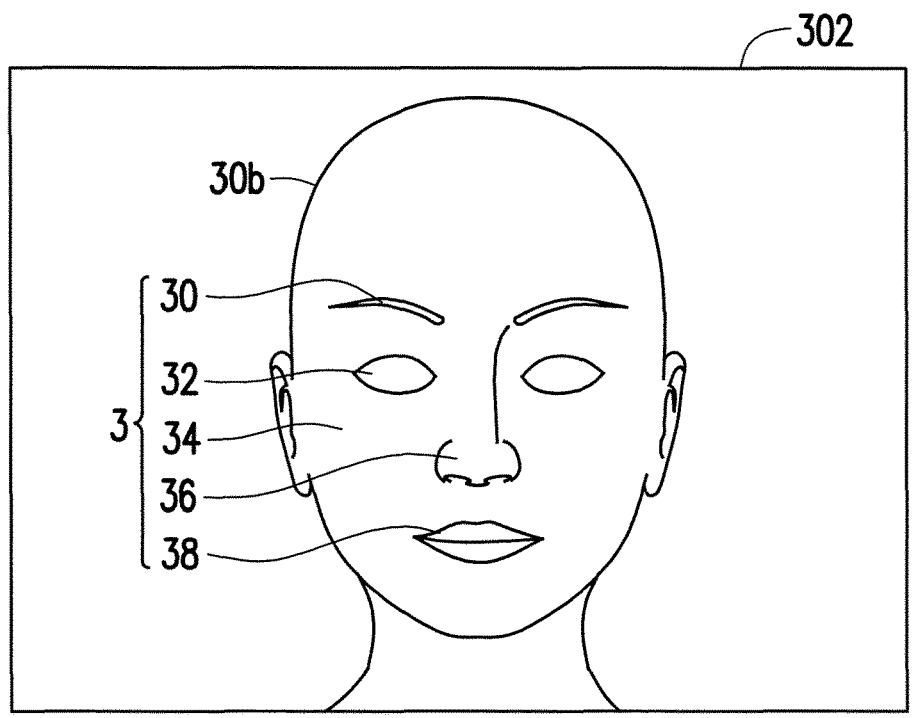
Figure 3C:
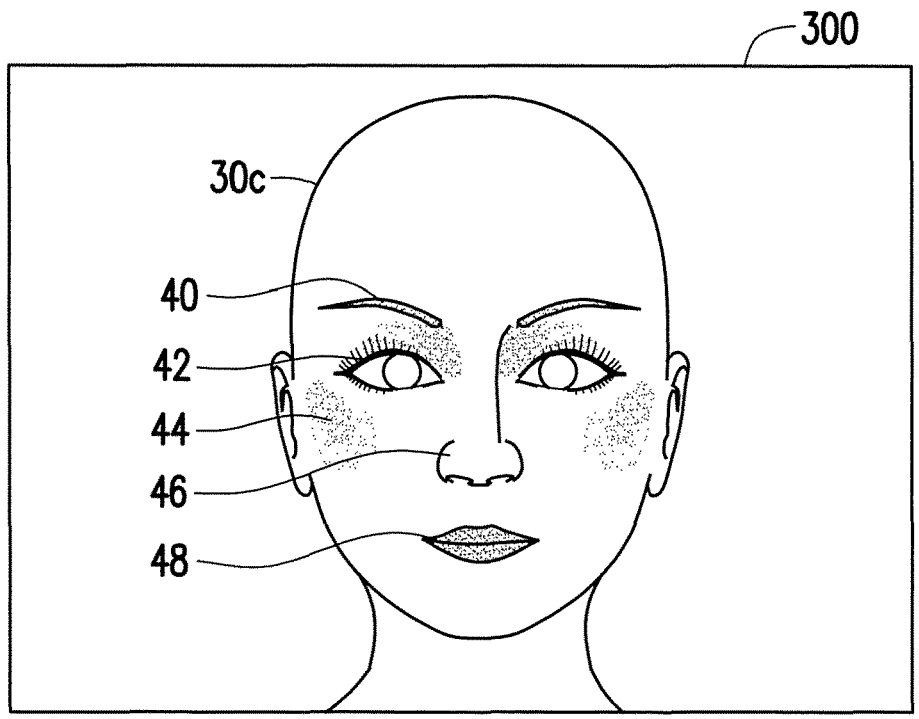

Please refer to FIG. 2, FIG. 3A, FIG. 3B and FIG. 3C. In step S203, the image processing module 120 adjusts the makeup face 30a in the first image 300. For example, a morphing process is applied on the makeup face 30a to adjust a scope of the makeup face 30a in the first image to match a predetermined face scope 30b in a predetermined image. The makeup face 30c which is already adjusted is shown in FIG. 3C.

Please refer to FIG. 3B and FIG. 3C. In step S205, the makeup feature capturing module 130 defines a plurality of areas on the adjusted makeup face 30c in the first image 300. The predetermined image 302 includes positions corresponding to a plurality of feature points of the predetermined face 30b. The feature point includes facial features, such as eyebrows 30, eyes 32, a cheek 34, a nose 36, a mouth 38, ears, a face contour and so on. The feature capturing module 130 captures positions of a plurality of feature points 3 corresponding to the predetermined face 30b, and further defines a plurality of areas corresponding to the facial features on the adjusted makeup face 30c according to the distribution positions of the feature points 3. As shown in FIG. 3C, the makeup feature capturing module 130 identifies the facial features on the adjusted makeup face 30c according to the feature points and an algorithm (also called as a first algorithm). For example, the feature points include eyebrows 40, eyes 42, a cheek 44, a nose 46, a mouth 48, ears, a face contour and so on. After the makeup feature capturing module 130 identifies the facial features, the areas corresponding to the facial features are constructed by calculating a distance between the eyebrow and eye, a distance between two eyes and a width of the mouth.

In an embodiment, the first algorithm is a scale-invariant feature transform (SIFT) or a speeded up robust features (SURF).

The scale-invariant feature transform is a computer vision algorithm, and it is used to identify and describe local features of an image. An extreme point is searched in spatial scale, and the position, the scale and the rotational invariant of the extreme point are extracted via the algorithm. For example, when the feature points of two images are compared, the more similar the images are, the more matching feature points of the two images have. Then, a similarity is determined. Moreover, according to the SIFT, an object is identified effectively via the identification of the local appearance on the object. For example, according to the SIFT, the object is identified based on the feature points of the local appearance on the object, but not based on the size and rotation of the image. The SIFT has high tolerance on light, noise and little changes of view angle. Consequently, the object is identified effectively and identification mistakes are reduced via the feature points of the object.

SURF is a stable image recognition and description algorithm which can also be used for computer vision tasks, such as the object recognition and the three-dimensional image re-construction. The concept and steps of the SURF algorithm are based on the SIFT. However, the detailed process has some differences. For example, the SURF algorithm includes three steps: identifying feature points, illustrating similar features, and matching descriptors. Then, the robustness of the SURF is improved multiple times as that of the SIFT.

In an embodiment, each area defined in step S205 is corresponding to a makeup category. The makeup category includes eyebrow makeup, eyes makeup, cheek makeup and lip makeup and so on. For example, the makeup category corresponding to the area of the eyebrow 40 is the eyebrow makeup, the makeup category corresponding to the area of the eyes 42 is the eyes makeup, The makeup category corresponding to the area of the cheek 44 is the cheek makeup, and the makeup category corresponding to the area of the mouth 48 is the lip makeup. Each makeup category includes a plurality of target makeup category makeup categories, and each target makeup category includes makeup patterns with multiple makeup features. In an embodiment, the eyes makeup includes at least eye shadows, eyeliners and eyelashes (such as, fake lashes or mascara) and so on. The cheek makeup includes at least two target makeup categories such as blusher and grooming. The eyebrow makeup includes a target makeup category such as the eyebrow shape. The lip makeup includes a target makeup category such as the lip shape. In other words, the target makeup category is the sub-classification of the makeup category. The number and the type of the target makeup category in each makeup category are various according to requirements, which are not limited herein. In an embodiment, each makeup category is defined by user to add or delete the target makeup categories of each makeup category. Moreover, the makeup feature includes color features, shape features, range features, material features or length features. For each target makeup category, a makeup effect presented by a combination of makeup features is the makeup patterns corresponding to the target makeup category.

Then, in step S207, the makeup feature capturing module 130 identifies at least one target makeup category in the makeup category of each of the corresponding facial feature areas, and captures a plurality of makeup features (also called as a first makeup feature) corresponding to the target makeup category by using the first algorithm. In an embodiment, taking an area corresponding to eyes for example, the makeup feature capturing module 130 identifies that the makeup category corresponding to the eyes 42 is the eyes makeup, and the eyes makeup includes at least eye shadows, eyeliners and eyelashes (such as, fake lashes or mascara). Then, the makeup feature capturing module 130 defines the eye shadows, eyeliners and eyelashes to a target makeup category.

Then, the makeup feature capturing module 130 captures the makeup features corresponding to the target makeup category. As shown in FIG. 4, in the eye shadow of the adjusted makeup face 30c, the makeup feature capturing module 130 captures the color feature, the shape feature, the range feature and the material feature. For example, the color feature is a gradation of blue and purple. The shape feature is a shape of an eye shadow. The range feature is an eyelid area within a width of eyes. The material feature is an eye shadow including sequins and shining powders. The eye shadow makeup effect presented by the makeup features is a makeup pattern 410 of the eye shadow.

In the eyeliner of the adjusted makeup face 30c, the makeup feature capturing module 130 captures the color feature, the shape feature and the range feature. For example, the color feature is black. The shape feature is a shape of eyes. The range feature is a profile around the whole eye. The eyeliner makeup effect presented by the makeup features is a makeup pattern 420 of the eyeliner. In the eyelashes of the adjusted makeup face 30c, the makeup feature capturing module 130 captures the color feature, the shape feature, the material feature and the length feature. For example, the color feature is black. The shape feature is a profile of the eye and a line of the eyelashes. The material feature is plastic. The length feature is 0.8 centimeter. Similarly, the eyelashes makeup effect presented by the makeup features is a makeup pattern 430 of the eyelashes. The target makeup category and the corresponding makeup features in FIG. 4 is an embodiment to illustrate the operation of the makeup feature capturing module 130, which is not limited herein.

Figure 3D:
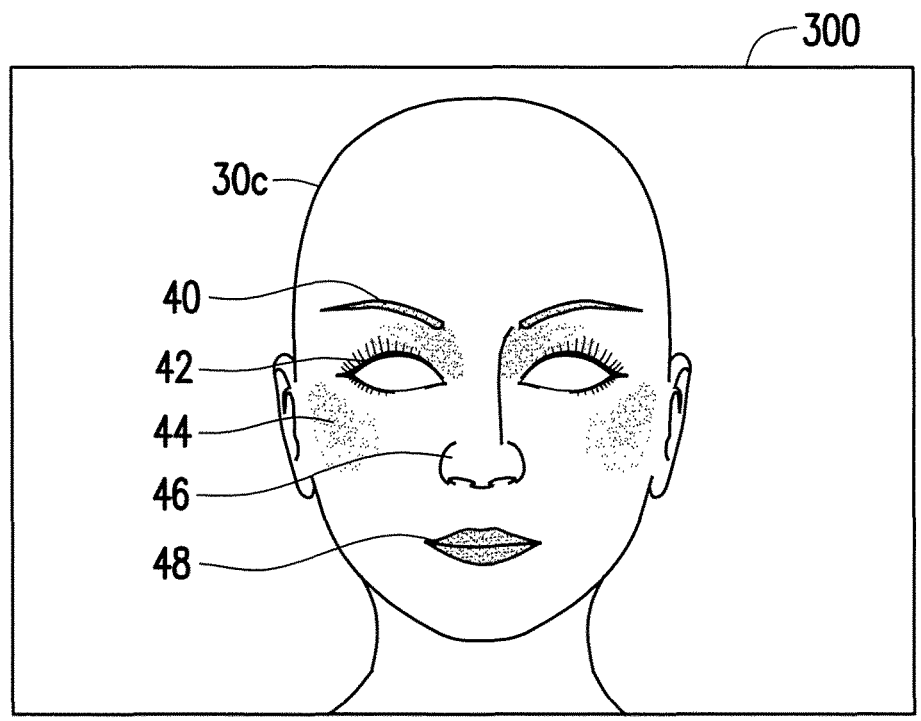

Similarly, the makeup feature capturing module 130 identifies that the target makeup category of the makeup category corresponding to the eyebrow 40 is the eyebrow makeup category, the target makeup category of the makeup category corresponding to the area of the cheek 44 are the blusher makeup category and the grooming makeup category, and the target makeup category corresponding to the mouth 48 is lip makeup category on the adjusted makeup face 30c, respectively. The makeup feature capturing module 130 captures the makeup features of the eyebrow makeup category, the blusher makeup category, the grooming makeup category and the lip makeup category, respectively. The capturing operation of the makeup features corresponding to the eye shadow, eyeliner and eyelashes is similar to the capturing operation of the makeup features corresponding to the eyebrow makeup category, the blusher makeup category, the grooming makeup category and the lip makeup category by the makeup feature capturing module 130, which is not repeated herein. Please refer to FIG. 3D. FIG. 3D shows all of the makeup patterns presented by the makeup features which are captured on each area of the adjusted makeup face 30c by the makeup feature capturing module 130. The makeup features captured from all target makeup categories on the adjusted makeup face 30c are called as the first makeup features.

Then, the makeup feature comparing module 140 compares the first makeup feature captured by the makeup feature capturing module 130 with the second makeup feature to classify the first makeup feature. The makeup features in the database 160 are called as the second makeup features. As mentioned above, for a target makeup category, a makeup effect presented by a combination of makeup features is the makeup patterns corresponding to the target makeup category. In other words, one target makeup category includes a plurality of different makeup patterns. Each makeup pattern includes at least one makeup feature. In the embodiment, the database 160 stores a plurality of makeup patterns of all target makeup categories. Each stored makeup pattern is different. That is, each makeup pattern stored in the database 160 includes different makeup features.

As shown in step S209, in the operation of comparing the first makeup feature captured by the makeup feature comparing module 140 with the second makeup feature in the database 160, the makeup feature comparing module 140 determines whether a difference between the first makeup feature and the second makeup feature in the database 160 is less than a difference threshold according to another algorithm (also called a second algorithm), and the second makeup feature and the first makeup feature belong to the same target makeup category.

In an embodiment, the makeup feature comparing module 140 digitalizes the first makeup feature whose target makeup feature classification is the eye shadow, and reads all makeup patterns whose target makeup feature classification is eye shadow from the database 160. Then, the makeup feature comparing module 140 compares the first makeup feature whose target makeup feature classification is the eye shadow with the second makeup feature of all makeup patterns corresponding to the eye shadow in the database 160. In an embodiment, the second algorithm is a support vector machines (SVM), a decision tree, a neural networks or a k-average algorithm. For example, SVM is a classification algorithm. Via a method of machine learning and supervised learning, input objects are taken as training data of the SVM to establish a mode or a function, and the output result is predicted according to the mode and the function. For example, the output result is a classification label (also called as a classification).

In the embodiment that the second algorithm is the SVM, the training data is the makeup pattern corresponding to each target makeup category in the database 160. All the first makeup features captured by the makeup feature capturing module 130 are classified into the first makeup feature of the target makeup category corresponding to the eye shadow, eyeliners, eyelashes, eyebrow, blusher, grooming and lip via the function established by the training data. Taking the first makeup feature corresponding to the eye shadow for example, the makeup feature comparing module 140 further compares the first makeup feature of the eye shadow with the second makeup feature of all makeup patterns corresponding to the eye shadow in the database 160 via the function established by the training data, to get an output result. For example, the output result is the difference between the first makeup feature corresponding to the eye shadow and the second makeup feature of all makeup patterns corresponding to the eye shadow in the database 160.

When the difference between the first makeup feature corresponding to the eye shadow and the second makeup feature corresponding to the eye shadow in the database 160 is not less than the difference threshold, in step S211, the makeup feature classifying module 150 determines that the first makeup feature is different from the second makeup feature, and adds a new makeup pattern (also called as a first makeup pattern) including the first makeup features in the target makeup category (that is, eye shadow) into the database 160.

Conversely, when the difference between the first makeup feature corresponding to the eye shadow and the second makeup feature corresponding to the at least one makeup pattern of the eye shadow in the database 160 is less than the difference threshold, in step S213, the makeup feature classifying module 150 determines that the first makeup features are same to the second makeup features corresponding to the makeup pattern corresponding to the eye shadow in the database 160, and labels the first makeup pattern with the makeup pattern (also called as a second makeup pattern) which is same to the first makeup pattern in the database 160. That is, the first makeup pattern is expressed by the second makeup pattern with the second makeup features in the database.

In step S215, the makeup feature classifying module 150 defines all the included makeup patterns of the makeup face 30c as an overall makeup pattern according to the first makeup pattern or the second makeup pattern which is newly added to the database 160, and stores the overall makeup pattern to the database 160.

Through the electronic device 100 and the method of establishing virtual makeup data executed by the virtual makeup data establishing platform 108, in an embodiment, the makeup pattern is automatically added to the database of the virtual makeup data establishing platform according to requirements. All makeup patterns corresponding to each target makeup category in the database are different. The makeup patterns can be used again.

Figure 5B:
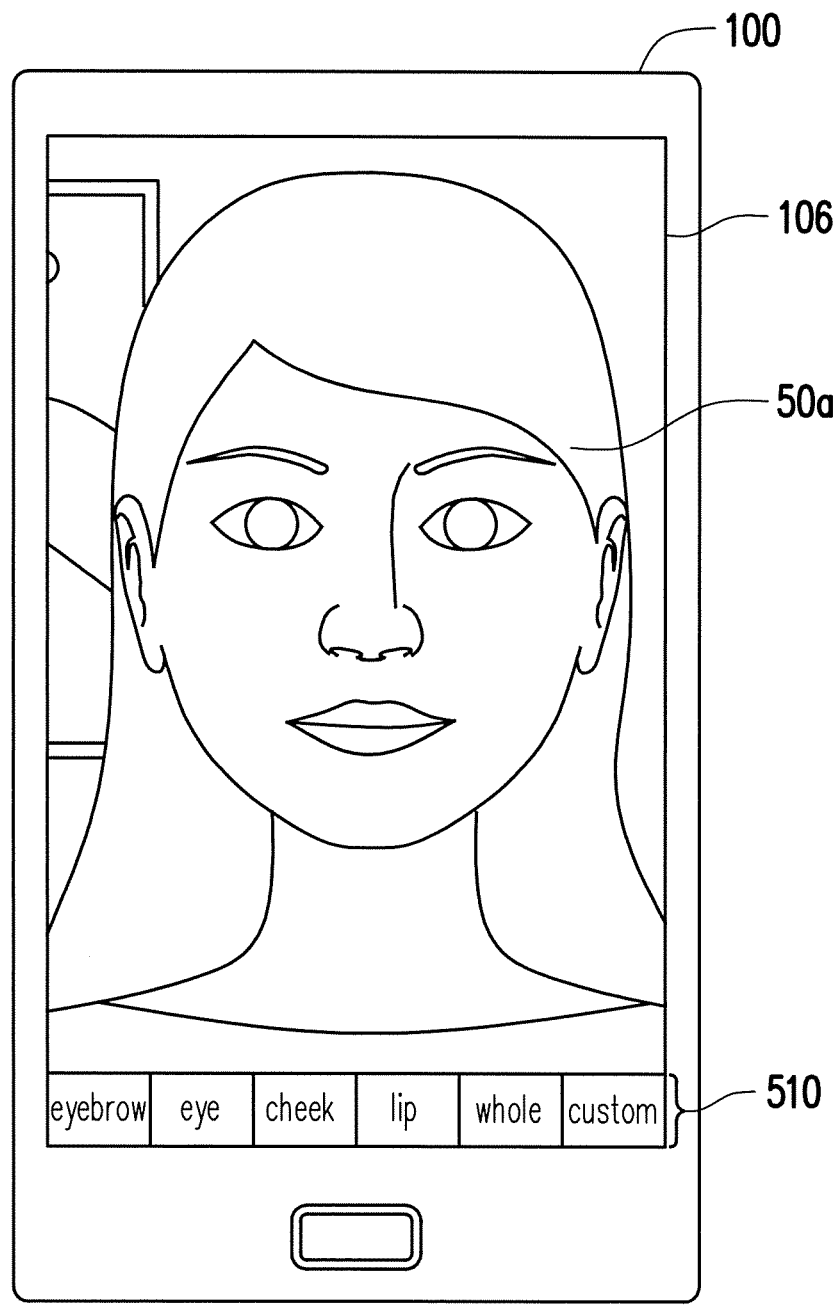

In an embodiment, the electronic device 100 and the virtual makeup data establishing platform 108 can present virtual makeup according to the instruction of the user. FIG. 5A to FIG. 5F are schematic diagrams showing a virtual makeup presented on an output image by a virtual makeup data establishing platform according to an input signal. Please refer to FIG. 5A, the input module 110 of the virtual makeup data establishing platform 108 receives an image 500 (also called as a second image 500) of a face 50a, and identifies the face 50a in the second image 500 via the image processing module 120. Similarly, an image with a face can be obtained via the electronic device 100 with a camera. For example, the user can capture a non-makeup or makeup face via a camera unit (not shown) of the electronic device 100. In another embodiment, the electronic device 100 receives or downloads the second image 500 with a face from another electronic device or a cloud database via network. The face 50a is a face of the user or others. In an embodiment, the electronic device 100 is a portable apparatus or a tablet computer. The display device 106 of the electronic device 100 is a touch screen. As shown in FIG. 5B. The second image 500 is further displayed on the display device 106 of the electronic device 100.

Figure 5C:
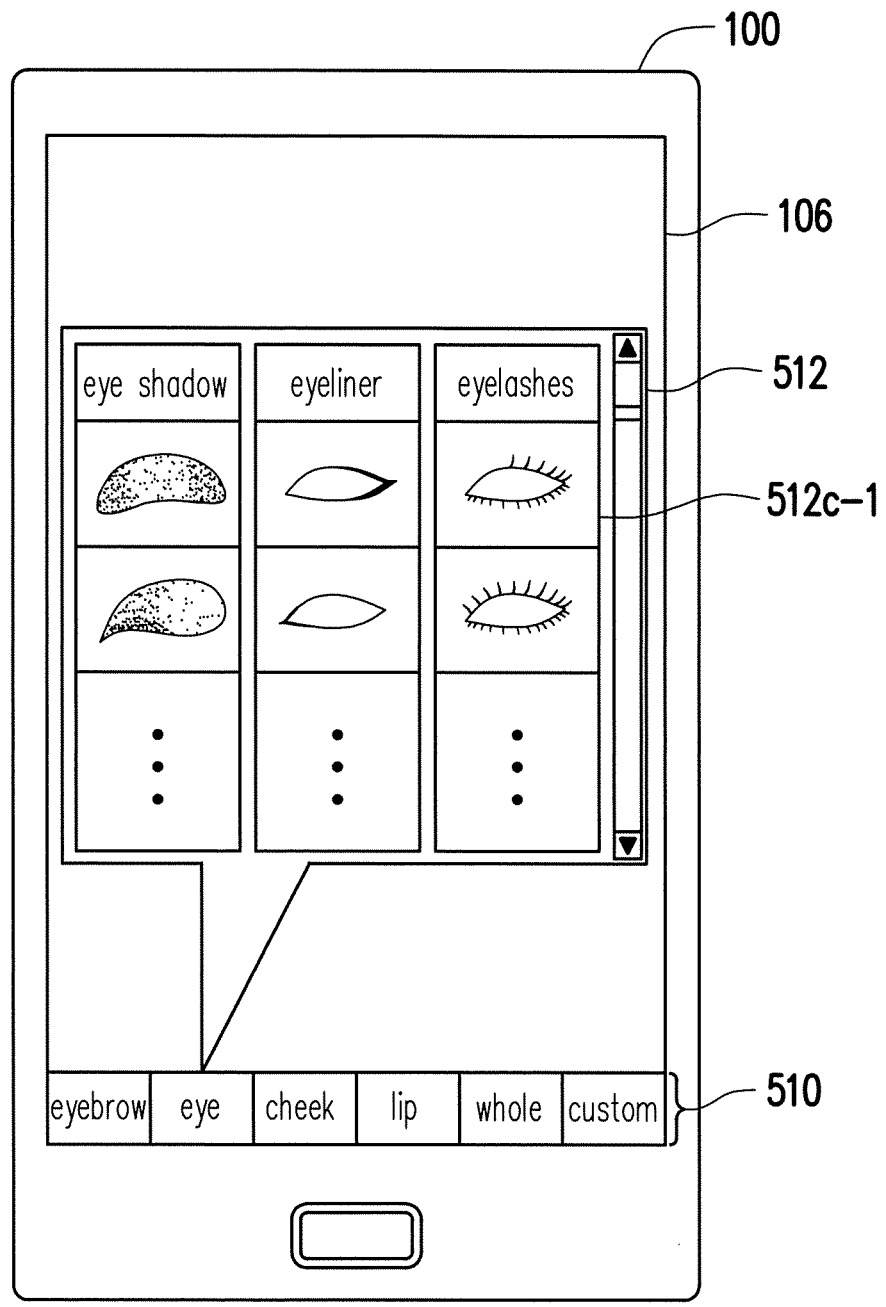
Figure 5D:
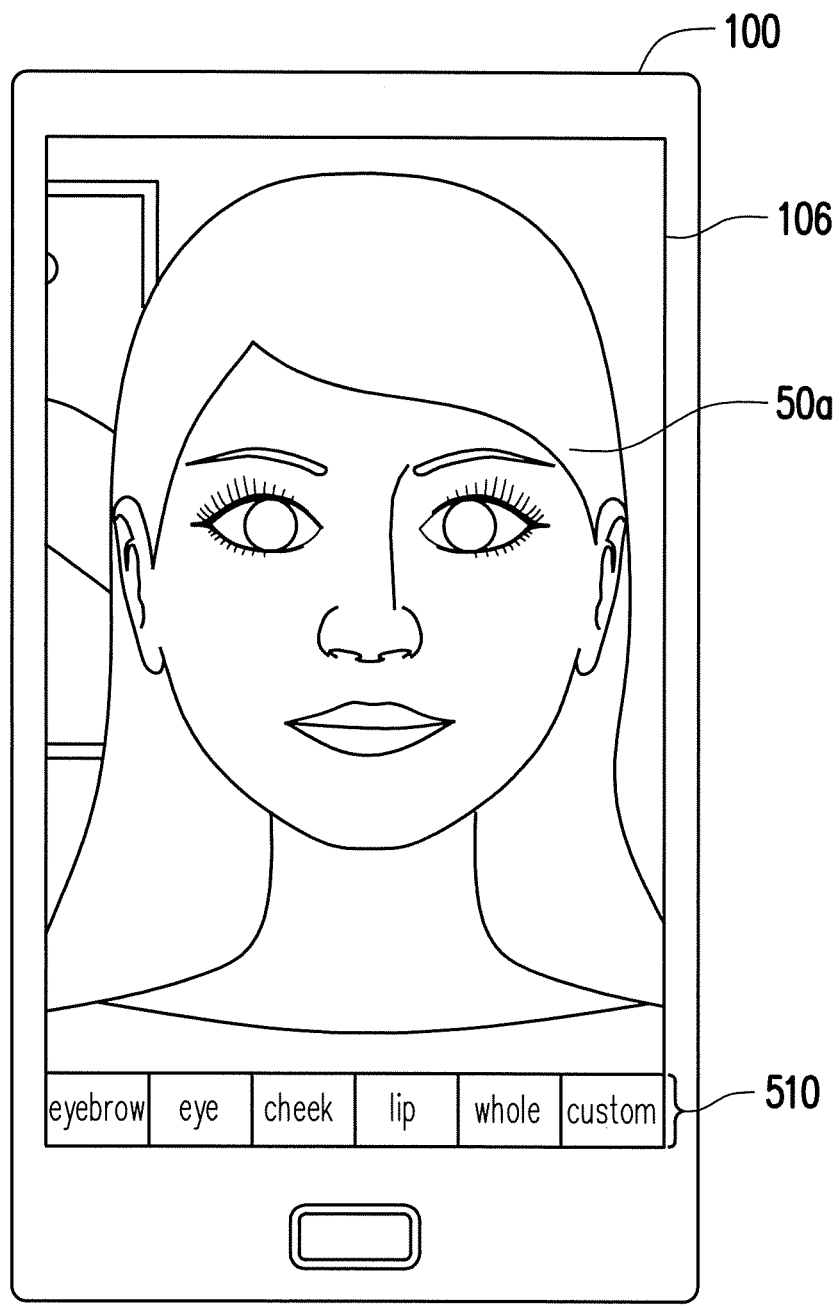

Please refer to FIG. 5B to FIG. 5D, the virtual makeup data establishing platform 108 displays options corresponding to each makeup category (such as eyebrow makeup, eyes makeup, cheek makeup and lip makeup), a whole makeup option and a toolbar 510 of a customized makeup option on the display device 106, to provide makeup effects for selection. For example, when the user selects the makeup category of the eyes makeup on the toolbar 510, the electronic device 100 displays all makeup patterns of the target makeup category (such as, eye shadows, eyeliners and eyelashes) included in the eye makeup in the database 160 at the eye makeup pattern interface 512 via the virtual makeup data establishing platform 108. If the user selects a makeup pattern 512c-1 (also called a third makeup pattern 512c-1) in the multiple makeup patterns corresponding to eyelashes, which is shown in FIG. 5D, the image processing module 120 applies the third makeup pattern 512c-1 in the database to the face 50a in the second image 500 according to an input signal corresponding to the third makeup pattern 512c-1 received by the input module 110, to generate an output image. The output image is displayed on the display device 106. The source of the third makeup pattern is not limited herein. For example, the third makeup pattern is a previously customized makeup pattern of the user (such as, the first makeup pattern), or a built-in or an existing makeup pattern in the database 160 (such as the second makeup pattern).

Figure 5E:
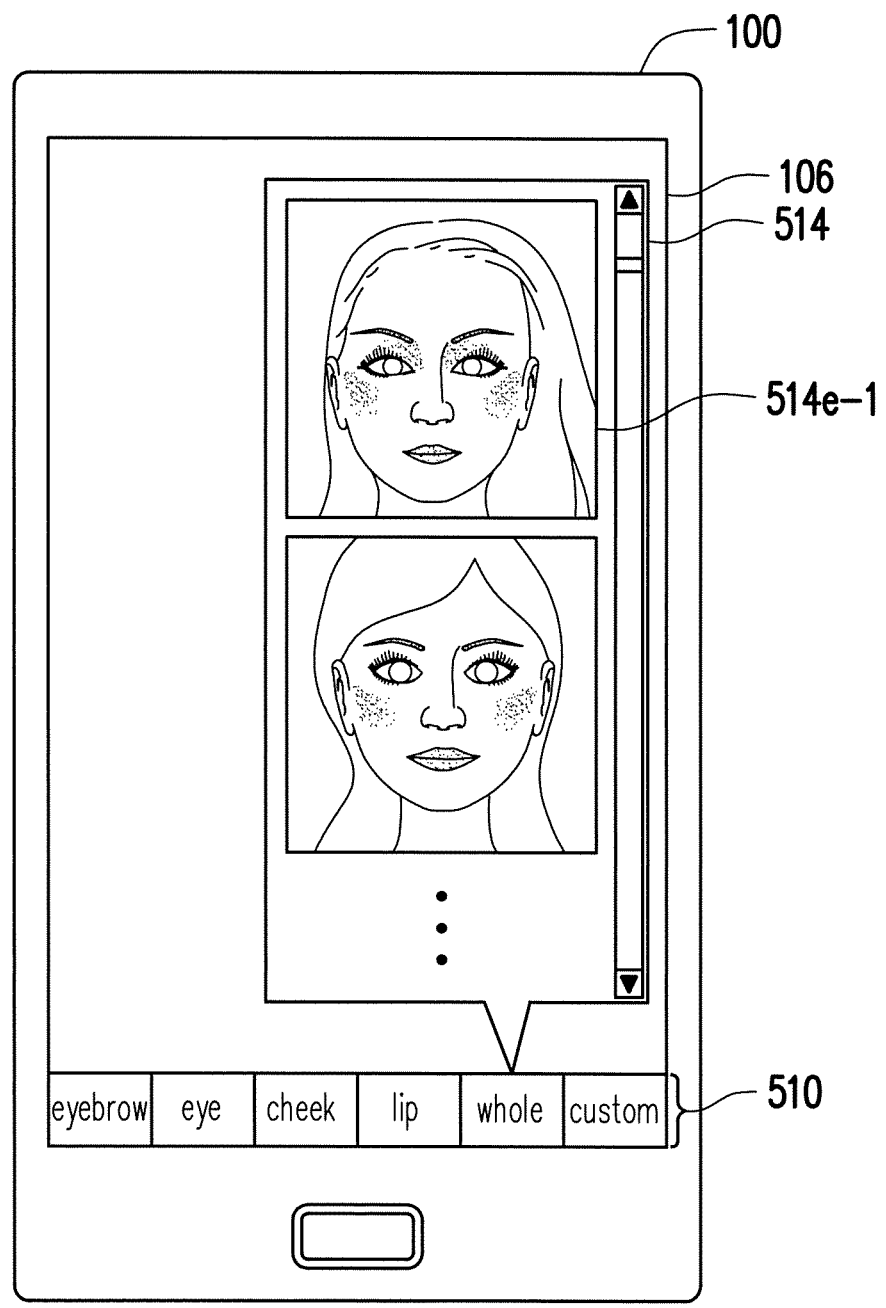
Figure 5F:
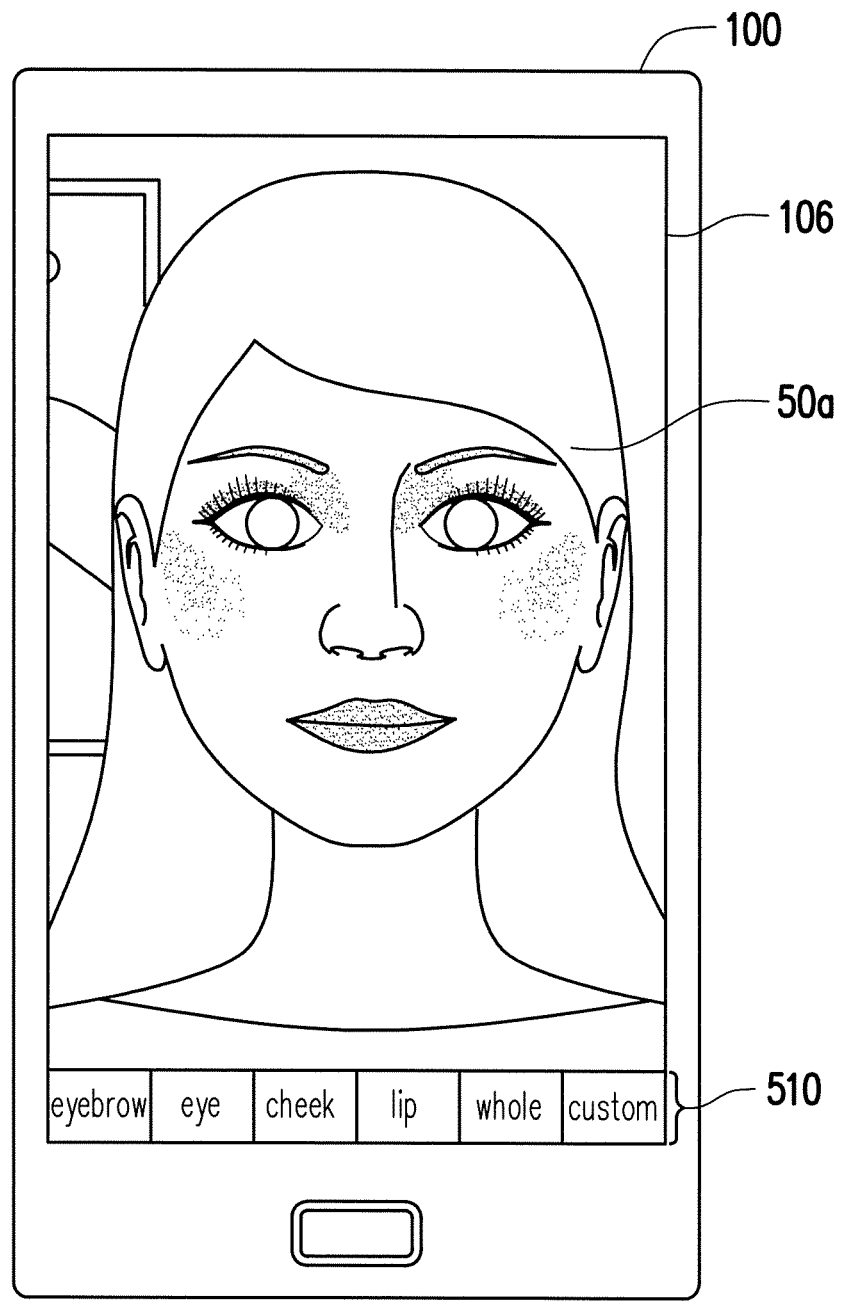

Please refer to FIG. 5E and FIG. 5F, in an embodiment, when the user selects the overall makeup option in the toolbar 510, the electronic device 100 displays all the overall makeup patterns stored in the database 160 on the overall makeup pattern interface 514 via the virtual makeup data establishing platform 108. For example, the overall makeup pattern 514e-1 is a contractible image of the image 300 of the makeup face which the user inputs previously and wants to simulate. When the overall makeup pattern 514e-1 is selected as shown in FIG. 5F, the image processing module 120 applies all makeup patterns corresponding to the overall makeup pattern 514e-1 in the database 160 on the face 50a in the second image 500 base on an input signal corresponding to the overall makeup pattern 514e-1 received by the input module 110. An output image is generated. The output image is displayed on the display device 106. Moreover, when the user selects the custom option in the toolbar 510, the virtual makeup data establishing platform 108 indicates the user to select the image of the makeup face which the user wants to simulate. The detailed description of establishing the virtual makeup data via the electronic device 100 and the virtual makeup data establishing platform 108 thereof are illustrated in above embodiments, which is not repeated herein.

Figure 6:
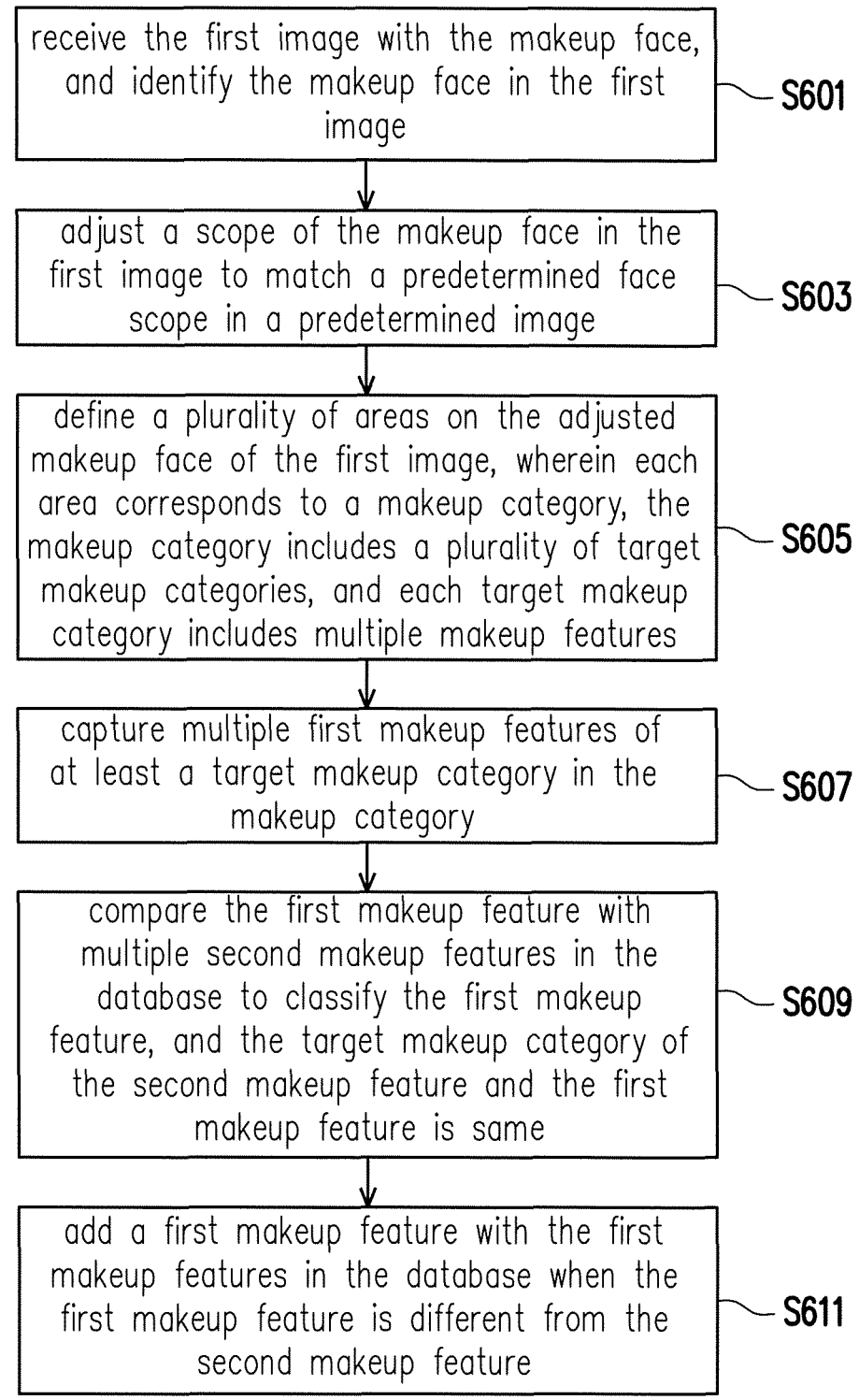
FIG. 6 is a flow chart showing a method of establishing virtual makeup data in an embodiment.

FIG. 6 is a flow chart showing a method of establishing virtual makeup data.

Please refer to FIG. 6, in step S601, the input module 110 receives the first image with the makeup face. The image processing module 120 identifies the makeup face in the first image.

In step S603, the image processing module 120 adjusts a scope of the makeup face in the first image to match a predetermined face scope in a predetermined image.

In step S605, the makeup feature capturing module 130 defines a plurality of areas on the adjusted makeup face of the first image. Each area corresponds to a makeup category.

The makeup category includes a plurality of target makeup categories. Each target makeup category includes multiple makeup features.

In step S607, the makeup feature capturing module 130 captures multiple first makeup features of at least a target makeup category in the makeup category.

Then, in step S609, the makeup feature comparing module 140 compares the first makeup feature with multiple second makeup features in the database 160 to classify the first makeup feature. The target makeup category of the second makeup feature and the first makeup feature is same.

Then, in step S611, the makeup feature classifying module 150 adds a first makeup feature with the first makeup features in the database 160 when the makeup feature comparing module 140 determines that the first makeup feature is different from the second makeup feature.

In addition, the above method is implemented by a non-transitory computer readable storage medium. The non-transitory computer readable storage medium stores at least one program instruction. After the at least one program instruction is loaded in the electronic device, the following steps are executed: receiving a first image with a makeup face, and identifying the makeup face in the first image; adjusting a scope of the makeup face in the first image to match a predetermined face scope in a predetermined image; defining a plurality of areas on the adjusted makeup face in the first image, wherein each area is corresponding to a makeup category, the makeup category includes multiple target makeup categories, and each target makeup category includes a plurality of makeup features; capturing a plurality of first makeup features of at least one target makeup category of the makeup category; comparing the first makeup features with a plurality of second makeup features in a database to classify the first makeup features, the target makeup category which the second makeup features are belonged to is same to the target makeup category which the first makeup features are belonged to; and adding a first makeup pattern with the first makeup features in the database when the first makeup features are different from the second makeup features.

The detailed description of each step in FIG. 6 is illustrated above, which is not repeated herein. In an embodiment, each step in FIG. 6 is implemented by multiple programs or circuits, which is not limited herein. The method in FIG. 6 is implemented by cooperating with the above embodiments or independently, which is not limited herein.

In sum, according to the method of establishing virtual makeup data, the virtual makeup data establishing platform, the electronic device with the virtual makeup data establishing platform and the non-transitory computer readable storage medium in embodiments, in comparing the makeup pattern captured on the makeup face which is input by the user with the existing makeup pattern in the virtual makeup data establishing platform, the number of the makeup patterns in the database is increased automatically by adding the makeup pattern which is different from the existing makeup patterns in the system to the database of the virtual makeup data establishing platform. Furthermore, all of the makeup patterns corresponding to each target makeup category in the database are different from each other. As a result, the user can reuse the makeup pattern later, and simulate the virtual makeup customized by the user according to the demand of the user. Moreover, the method of establishing virtual makeup data, the virtual makeup data establishing platform, the electronic device with the virtual makeup data establishing platform and the non-transitory computer readable storage medium can elastically present a part of or the overall virtual makeup pattern according to the instruction of the user. In conclusion, the virtual makeup patterns of the virtual makeup system can be expanded and changed according to requirements. The practicality of the virtual makeup data establishing platform and the operation convenience of the user are improved.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A method of establishing virtual makeup data, adapted to an electronic device, comprising:
   receiving a first image with a makeup face, and identifying the makeup face in the first image;
   applying a morphing process on the makeup face to adjust a scope of the makeup face in the first image to match a predetermined face scope in a predetermined image, wherein the predetermined face includes a plurality of feature points, and the feature points include facial features;
   defining a plurality of areas corresponding to the facial features on the adjusted makeup face in the first image, wherein each of the areas corresponds to a makeup category, the makeup category includes a plurality of target makeup categories, and each of the target makeup categories includes a plurality of makeup features;
   identifying at least one of the target makeup categories of the makeup category corresponding to each of the areas;
   capturing a plurality of first makeup features of at least one of the target makeup categories according to a first algorithm, wherein the first algorithm comprises a computer vision algorithm or an image recognition and description algorithm;
   determining whether a difference between the first makeup features and a plurality of second makeup features in a database is less than a difference threshold via a second algorithm;
   determining that the first makeup features are different from the second makeup features when the difference between the first makeup features and the second makeup features in the database is not less than the difference threshold, wherein the second algorithm is a classification algorithm, and a target makeup category which the second makeup features are belonged to is same to the target makeup category which the first makeup features are belonged to; and
   adding a first makeup pattern including the first makeup features into the target makeup category of the database when the first makeup features are different from the second makeup features.

2. The method of establishing virtual makeup data according to claim 1, further comprising:
   when the first makeup features are the same to the second makeup features, the first makeup pattern including the first makeup features is represented by a second makeup pattern including the second makeup features in the database.

3. The method of establishing virtual makeup data according to claim 2, further comprising:
   defining all makeup patterns in the makeup face as an overall makeup pattern according to the first makeup pattern or the second makeup pattern that added in the database, and storing the overall makeup pattern in the database.

4. The method of establishing virtual makeup data according to claim 1, wherein in the step of defining the areas on the adjusted makeup face in the first image further includes:
   capturing the feature points corresponding to the predetermined face; and
   defining the areas corresponding to the facial features on the adjusted makeup face according to the first algorithm and distribution positions of the feature points, wherein the first algorithm comprises a scale-invariant feature transform (SIFT) or a speeded up robust features (SURF).

5. The method of establishing virtual makeup data according to claim 3, wherein after the step of defining all makeup patterns in the makeup face as the overall makeup pattern according to the first makeup pattern or the second makeup pattern added in the database, and storing the overall makeup pattern in the database, further includes:
   receiving a second image with a face, and identifying the face in the second image;
   receiving an input signal, and applying a third makeup pattern in the database or the overall makeup pattern corresponding to the makeup face of the first image to the face of the second image according to the input signal to generate an output image, wherein the third makeup pattern is the first makeup pattern or the second makeup pattern that have been added to the database; and
   displaying the output image.

6. An electronic device with a method of establishing virtual makeup data, comprising:
   a storage device configured to store a database and a plurality of modules; and
   a processor, connected to the storage device and configured to load and execute the modules stored in the storage device, the modules include an input module, an image processing module, a makeup feature capturing module, a makeup feature comparing module and a makeup feature classifying module,
   wherein the input module receives a first image with a makeup face, and the image processing module identifies the makeup face in the first image,
   the image processing module applies a morphing process on the makeup face to adjust a scope of the makeup face in the first image to match a predetermined face scope in a predetermined image, wherein the predetermined face includes a plurality of feature points, and the feature points include facial features,
   the makeup feature capturing module defines a plurality of areas on the adjusted makeup face in the first image, each of the areas corresponds to a makeup category, the makeup category includes a plurality of target makeup categories, and each of the target makeup categories includes a plurality of makeup features,
   the makeup feature capturing module captures a plurality of first makeup features corresponding to at least one of the target makeup categories, wherein the makeup feature capturing module identifies at least one of the target makeup categories of the makeup category corresponding to each of the areas, and captures the first makeup features of the target makeup category according to a first algorithm, wherein the first algorithm comprises a computer vision algorithm or an image recognition and description algorithm;
   the makeup feature comparing module compares the first makeup features with a plurality of second makeup features in a database to classify the first makeup features, and the target makeup category which the second makeup features are belonged to is the same to the target makeup category which the first makeup features are belonged to; and the makeup feature classifying module adds a first makeup pattern including the first makeup features to the target makeup category of the database when the first makeup features are different from the second makeup features, wherein the makeup feature comparing module determines whether a difference between the first makeup features and the second makeup features in the database is less than a difference threshold according to a second algorithm, and when the difference between the first makeup features and the second makeup features of the database is not less than the difference threshold, the makeup feature comparing module determines that the first makeup features are different from the second makeup features, wherein the second algorithm is a classification algorithm.

7. The electronic device according to claim 6, wherein when the first makeup features are same to the second makeup features, the makeup feature classifying module represents the first makeup pattern including the first makeup features via a second makeup feature including the second makeup features in the database.

8. The electronic device according to claim 7, wherein the makeup feature classifying module defines all makeup patterns in the makeup face as an overall makeup pattern according to the first makeup pattern or the second makeup pattern that have been added in the database, and the makeup feature classifying module stores the overall makeup pattern in the database.

9. The electronic device according to claim 8, wherein the electronic device further includes a display device connected to the processor, wherein the input module receives a second image with a face, and the image processing module identifies the face in the second image, the image processing module applies a third makeup pattern in the database or the overall makeup pattern corresponding to the makeup face in the first image to the face in the second image according to an input signal from the input module for generating an output image, and displays the output image by the display device, wherein the third makeup pattern is the first makeup pattern or the second makeup pattern that have been added to the database.

10. A non-transitory computer readable storage medium configured to store at least one program instruction, after at least one program instruction is loaded in an electronic device, steps are executed:

receiving a first image with a makeup face, and identifying the makeup face in the first image;

applying a morphing process on the makeup face to adjust a scope of the makeup face in the first image to match a predetermined face scope in a predetermined image, wherein the predetermined face includes a plurality of feature points, and the feature points include facial features;

defining a plurality of areas on the adjusted makeup face in the first image, wherein each area corresponds to a makeup category, the makeup category includes a plurality of target makeup categories, and each of the target makeup categories includes a plurality of makeup features;

identifying at least one of the target makeup categories of the makeup category corresponding to each of the areas;

capturing a plurality of first makeup features of at least one of the target makeup categories according to a first algorithm, wherein the first algorithm comprises a computer vision algorithm or an image recognition and description algorithm;

determining whether a difference between the first makeup features and a plurality of second makeup features in a database is less than a difference threshold via a second algorithm;

determining that the first makeup features are different from the second makeup features when the difference between the first makeup features and the second makeup features in the database is not less than the difference threshold, wherein the second algorithm is a classification algorithm, and a target makeup category which the second makeup features are belonged to is same to the target makeup category which the first makeup features are belonged to; and adding a first makeup pattern including the first makeup features into the target makeup category of the database when the first makeup features are different from the second makeup features.

11. The non-transitory computer readable storage medium according to claim 10, wherein the step further includes:

when the first makeup features are same to the second makeup features, the first makeup pattern with the first makeup features is presented by a second makeup pattern with the second makeup features in the database.

12. The non-transitory computer readable storage medium according to claim 11, wherein the step further includes:

defining all makeup patterns in the makeup face as an overall makeup pattern according to the first makeup pattern or the second makeup pattern that have been added in the database, and storing the overall makeup pattern in the database.

13. The non-transitory computer readable storage medium according to claim 10, the step of defining the areas on the adjusted makeup face in the first image includes:

capturing the feature points corresponding to the predetermined face; and defining the areas on the adjusted makeup face according to the first algorithm and distribution positions of the feature points.

14. The non-transitory computer readable storage medium according to claim 12, wherein after the step of defining all makeup patterns in the makeup face as the overall makeup pattern according to the first makeup pattern or the second makeup pattern added in the database, and storing the overall makeup pattern in the database, further includes:

receiving a second image with a face, and identifying the face in the second image;

receiving an input signal, and applying a third makeup pattern of the database or the overall makeup pattern corresponding to the makeup face in the first image to the face in the second image according to the input signal to generate an output image, wherein the third makeup pattern is the first makeup pattern or the second makeup pattern which is added to the database; and displaying the output image.

* * * * *